US007570802B2

United States Patent
Iordanescu et al.

(10) Patent No.: US 7,570,802 B2
(45) Date of Patent: Aug. 4, 2009

(54) AUTOMATED CENTERLINE DETECTION ALGORITHM FOR COLON-LIKE 3D SURFACES

(75) Inventors: Gheorghe Iordanescu, Rockville, MD (US); Ronald M. Summers, Potomac, MD (US); Juan Raul Cebral, Vienna, VA (US)

(73) Assignee: The United States of America as represented by the Secretary of the Department of Health and Human Services, Washington, DC (US)

( * ) Notice: Subject to any disclaimer, the term of this patent is extended or adjusted under 35 U.S.C. 154(b) by 487 days.

(21) Appl. No.: 10/500,342

(22) PCT Filed: Dec. 18, 2002

(86) PCT No.: PCT/US02/40641

§ 371 (c)(1),
(2), (4) Date: Dec. 30, 2004

(87) PCT Pub. No.: WO03/058553

PCT Pub. Date: Jul. 17, 2003

(65) Prior Publication Data

US 2005/0117787 A1    Jun. 2, 2005

Related U.S. Application Data

(60) Provisional application No. 60/343,975, filed on Dec. 27, 2001.

(51) Int. Cl.
*G06K 9/00* (2006.01)
(52) U.S. Cl. .................. 382/154; 382/128; 382/130; 382/131; 382/133; 600/407
(58) Field of Classification Search .................. 382/154
See application file for complete search history.

(56) References Cited

U.S. PATENT DOCUMENTS 5,728,044 A    3/1998    Shan (Continued)

FOREIGN PATENT DOCUMENTS

WO    WO 9832371 A1    7/1998

OTHER PUBLICATIONS

Bitter, Ingmar et al.; "Penalized-Distance Volumetric Skeleton Algorithm"; *IEEE Transactions on Visualization and Computer Graphics*; Jul.-Sep. 2001; pp. 195-206; vol. 7, No. 3.

(Continued)

*Primary Examiner*—Samir A. Ahmed
*Assistant Examiner*—Edward Park
(74) *Attorney, Agent, or Firm*—Townsend and Townsend and Crew LLP; Guy W. Chambers

(57) ABSTRACT

A three dimensional image of the colon like surface is processed to determine at least its ring structure. The image is composed of vertex points, each vertex point having a discrete point identifier and three dimensional position information. The three dimensional position information is averaged in a shrinking procedure to contract the three dimensional image proximate to a major axis of the colon-like surface. Evenly spaced points are taken through the shrunken colon like surface and connected to form a curve. Planes are generated at intervals normal to the curve to split the shrunken colon like surface into image segments. By mapping these image segments back to the original image through their discrete point identifiers, an accurate ring profile of the colon like surface can be generated.

19 Claims, 14 Drawing Sheets

U.S. PATENT DOCUMENTS

| | | | | |
|---|---|---|---|---|
| 5,782,762 | A | * | 7/1998 | Vining .................. 600/407 |
| 5,920,319 | A | * | 7/1999 | Vining et al. ............... 345/420 |
| 5,971,767 | A | | 10/1999 | Kaufman et al. |
| 6,246,784 | B1 | | 6/2001 | Summers et al. |
| 7,194,117 | B2 | * | 3/2007 | Kaufman et al. ............ 382/128 |

OTHER PUBLICATIONS

Chiou, Rui C.H. et al.; "An Interactive Fly-Path Planning Using Potential Fields and Cell Decomposition for Virtual Endoscopy"; *IEEE Transactions on Nuclear Science*; Aug. 1999; pp. 1045-1049; vol. 46, No. 4.

GE, Yaorong et al.; "Computing the Centerline of a Colon: a Robust and Efficient Method Based on 3D Skeletons"; *Journal of Computer Assisted Tomography*: 1999; 786-794; 23(5).

McFarland, Elizabeth G. et al.; "Spiral Computed Tomographic Colonography; Determination of the Central Axis and Digital Unravelling of the Colon"; *Acad, Radiology*: May 1997; pp. 367-373; vol. 4; Association of University Radiologists.

Paik, David S. et al.; "Automated flight path planning for virtual endoscopy"; *Medical Physics*; May 1998; pp. 629-637; vol. 25, No. 5; American Assoc. of Physicists in Medicine.

Schroeder, W.J. et al.; "Decimation of Triangle Meshes"; *Computer Graphics*: Jul. 1992; pp. 65-70; vol. 26, No. 2.

Shannon, C.E.; "A Mathematical Theory of Communication"; *The Bell System Technical Journal*: Jul. 1948; pp. 379-423; vol. 27, No. 3.

Taubin, Gabriel; "Curve and Surface Smoothing Without Shrinkage"; *IEEE*; 1995; pp. 852-857.

Truyen, Roel et al.; "Efficacy of automatic path tracking in virtual colonoscopy"; *CARS 2001*: 2001; H.U. Lemke et al., Editors: Elsevier Science B.V.

Wang, Jie and Yaorong GE; "An optimization problem in virtual endoscopy"; *Theoretical Computer Science*; 1998; pp. 203-216; vol. 207; Elsevier Science B.V.

Wyatt, C.L. et al.; "Automatic segmentation of the colon for virtual colonoscopy"; *Computerized Medical Imaging and Graphics*; 2000; pp. 1-9; vol. 24; Elsevier Science Ltd.

* cited by examiner

Shrunken 3d surface of the human colon
(Number of iterations = 250)

Whichever vertex from VC is good enough for modeling the shrunken colon.

Two possible versions of the shrunken colon model.

All vertices from the original colon (who are obtained by remapping the vertices from the selected area in the shrunken colon) from a "ring" whose axis is parallel to the colon centerline.

Ideal ring of ideal (cylinder-like) colon surface.

Actual shape of the ring is quite different. One way of selecting the corresponding centerline.

A possible approach to automatically compute the centerline detection algorithm parameters

AUTOMATED CENTERLINE DETECTION ALGORITHM FOR COLON-LIKE 3D SURFACES

STATEMENT AS TO RIGHTS TO INVENTIONS MADE UNDER FEDERALLY SPONSORED RESEARCH AND DEVELOPMENT

This invention was made with government support by the National Institutes of Health Clinical Center's intramural research program. The government has certain rights in this invention.

This invention relates to virtual colonoscopy and includes processing computer tomographic image slices of the patient. The disclosure assumes the procurement of a three dimensional image of the colon like surface of vertex points distributed along an elongate major axis, each vertex point having a discrete point identifier and three dimensional position information. In this disclosure, an accurate ring profile of the colon like surface can be generated. Utilizing the accurate ring profile, reconstruct the 3D surface of the colon, serially view the colon cross-section for anomalies such as polyps and thus provide both non-invasive colon screening together with the positional information needed for follow up conventional colonoscopy.

BACKGROUND OF THE INVENTION

Virtual Colonoscopy is a relatively new field in medicine and consists in processing the computer tomographic (CT) image planes or "slices" of the patient rather than the traditional and invasive colonoscopic inspection. By segmenting the original parallel CT slices, it is possible to reconstruct the 3D surface of the colon and thus provide the information needed for Colonoscopy. Such a process is disclosed in Summers et al. U.S. Pat. No. 6,246,748 issued Jun. 12, 2001 and entitled Method for Segmenting Medical Images and Detecting Surface Anomalies in Anatomical Structures. This disclosure assumes as a starting point that an image similar to that produced by Summers et al '748 is produced.

Assuming the presence of such an image, further processing of the image such as detecting the centerline of the colon is still a challenging problem. The following articles are representative of relevant image processing techniques that can be used to address this problem:

Gabriel Taubin, "Curve and Surface Smoothing without Shrinkage", *IEEE* (1995);

Ingmar Bitter, et al., "Penalized-Distance Volumetric Skeleton Algorithm", *IEEE Transactions on Visualization and Computer Graphics*, Vol.7, No. 3, July-September 2001;

Ge, Y., D. R. Stelts, et al., "Computing the centerline of a colon; a robust and efficient method based on 3D skeletons", *J Comput Assist Tomogr*, 23(5): 786-94 (1999);

Jie Wang, Yaorong Ge, "An Optimization problem in Virtual Colonoscopy", *Theoretical Computer Science, Elsevier Science* B. V., pp 203-216 (1998);

Yaorong Ge, et al., "Computing the Centerline of a Colon: a Robust and Efficient Method Based on 3D Skeletons", *Journal of Computer Assisted Tomography*, 23(5):786-794 (1999);

Rui Chiou, et al., "An Interactive Fly-Path Planning Using Potential Fields and Cell Decomposition for Virtual Endoscopy", *IEEE Transactions on Nuclear Science*, Vol 46, No. 4, Aug. 1999;

David Paik, et al., "Automated flight path planning for virtual endoscopy", *American Assoc Of Physicists in Medicine* (1998);

C. L. Wyatt, et al., "Automatic Segmentation of the Colon for Virtual Colonoscopy", *Elsevier Science* (2000);

Elisabeth McFarland, et al., "Spiral Computed Tomographic Colonography: Determination of the Central Axis and Digital Unravelling of the Colon", *Technical Report, Acad. Radiology*, 4:367-373 (1997);

Roel Truyen, et al., "Efficacy of automatic path tracking in Virtual colonoscopy", Cars 2001—H. U Lemke, et al. (Editors), *Elsevier Science* (2001).

C. E. Shannon, "A Mathematical Theory of Communication", *Bell System Tech. J*, 379-423 (1948); and W. J. Schroeder, et al., "Decimation of Triangle Meshes", *Computer Graphics*, 26:26 (1992).

The reader will understand that the colonoscope is the usual instrument used both for inspection and surgery of the colon. The measurements of the colon must be all related to the path of the colonoscope, always from the rectum. In making its penetration of the colon, the colon "gathers" the invading colonoscope into the serpentine path of the major axis of the colon while the colonoscope "hunts" this path within the confines of the colon. As a consequence of this well known and understood technique of using a colonoscope, relevant measurements taken with respect to the colon by non-invasive CT scans must all be related to penetration of a colonoscope.

Further, scans taken by a colonoscope must be able to be compared to non-invasive scans taken by computer tomography to establish the efficacy of the non-invasive scans. Likewise, and assuming efficacy of the non-invasive scans, the findings of the non-invasive scans must be directly translatable to the doctor using colonoscope to be of practical value.

BRIEF SUMMARY OF THE INVENTION

A virtual non-invasive colonoscopy of a colon like surface includes processing computer tomographic image slices of the patient. The procurement of a three dimensional image of the colon like surface of vertex points, each vertex point having a discrete point identifier and three dimensional position information is presumed. The three dimensional position information of all vertex's neighbors is averaged in a shrinking procedure to contract the three dimensional image proximate to a major axis of the colon-like surface, with the overall length of the colon along the major axis remaining substantially unchanged. Evenly spaced points are taken through the shrunken colon like surface and connected to form a curve. Planes are generated at intervals normal to the curve to split the shrunken colon like surface into image segments. By mapping these image segments back to the original image through their discrete vertex point identifiers, an accurate ring profile of the colon like surface can be generated. Utilizing the accurate ring profile, it is possible to compute an accurate colon centerline, serially view the colon cross-section for anomalies such as polyps and thus provide both non-invasive colon screening together with the positional information needed for follow up conventional colonoscopy.

As of the filing of this Patent Cooperation Treaty application, an improved technique for modeling of the centerline of the colon includes taking the image of the shrunken colon and choosing and marking a first random vertex. The reader will understand that all vertices on the shrunken image of the colon are by definition very close to the colon centerline by virtue of the fact of the image being a shrunken image. Once this first random vertex is chosen, all unmarked neighbors of the random vertex of the shrunken image of the colon are identified and marked. The identification and marking process is sequentially repeated from each marked neighbor to all unmarked neighbors. When the identification and marking process propagates a predetermined distance (preferably a multiple of the maximum diameter of the shrunken colon, plus or minus a chosen tolerance), a second random vertex is designated. A third random vertex is chosen at substantially the same interval from the first random vertex, but in the opposite direction. Thus, starting with the first random vertex, marking of the vertices propagates from the first random vertex to both ends of the shrunken colon image. In this process, all unmarked neighbors of each random vertex are identified and marked until the process propagates the predetermined distance, a new random vertex is designated, and marking process continued. The marking of vertices thus proceeds from the first random vertex, located centrally of the colon, to spaced random vertices extending along the colon to the respective ends of the colon at the anal verge and the cecum.

The reader will understand that since we are working on an image of a shrunken colon, all vertices on the surface of the shrunken image must by definition be very close to the colon centerline. Thus, the shrunken colon surface, the centerline of the shrunken colon, and the centerline taken along the length of the colon are all essentially the same. They have the essentially the same (serpentine) three dimensional position in space along the length of the colon.

An advantage of this marking system is that it eliminates the use of vectors in determining the centerline of the colon. The simple process of vertex identification and marking followed by designating vertices systematically tracks the length of the shrunken image of the colon from the first random vertex to both colon ends.

In the following disclosure, it is necessary to define terms. These terms are:

Colon like surface: This term obviously includes the colon. It includes other surfaces within the human body that are elongate about what can be generally termed a major axis or axes. Such surfaces can also include blood vessels, biliary ducts, airways, small intestine, spinal canal and cord.

Major axis or axes: When one views a body structure, such as the colon, an irregular enclosed but generally cylindrical elongate structure is shown. Elongation can be said to occur generally proximate to a major axis of the structure. This major axis is not the same as the ultimately computed centerline. Further, this term is used in this disclosure to express an intuitive concept perceived by observing the elongate colon structure.

Vertex point: This is the discrete informational image point that together with many other similar image points makes up the initial image processed by this invention. Such vertex points each have a discrete identifier. Further, the vertex points have three dimensional image information, commonly in Cartesian coordinates. As will be apparent in what follows, this disclosure alters the positional information in a shrinking process. The shrinking process leaves the colon like surface length substantially unchanged along the major axis but drastically shrinks the width of the colon like surface. Once shrinking has occurred, the shrunken image is parsed and mapped back to the original image utilizing the discrete identifiers.

Shrunken colon like surface: This is a 3D surface, obtained from the originally supplied 3D-colon like surface. The shrunken colon is very thin and almost as long as the original colon. The shrunken colon like surface has the same number of vertices as the original colon and the same "structure." The vertices neighborhood relation is the same, indexed (triangle) strip sets are the same.

Stated in theoretical terms, this means that, for every integer "i" and "k", if vertex Vi (vertex number i) has vertex Vk (vertex number k) as a neighbor in the original colon, there will be a vertex Vi in the shrunken colon that will have a neighbor Vk. The only difference will be in the three dimensional image information. In the "shrunken colon like surfaces", the distances from the major axis to the vertex points will be almost 10 to 100 times smaller in the shrunken colon as in original colon image.

Rings: It will be understood that slices of the (original or shrunken) colon like surfaces generally are normal to the major axis of the elongate surface. These slices are deformed cylinders. These cylinders will be large in the original image and small in the shrunken image and composed of vertex points. We also want the axis of these cylinders to be parallel to (if not included in) the centerline of the original or shrunken colon. When this happens we also refer to such slices as "perpendicular rings."

Centerline: This is the most useful output of our image manipulation. It approximates the gathered path of a colonoscope as it hunts centrally of the colon. It is close to the more mathematically elaborated concept of skeletons. We want the centerline to closely model the inserted profile of the colonoscope, which is semi-rigid and cannot make sharp bends. Intuitively the centerline of a colon-like surface should be the curve that stays inside the colon and never goes "too close" to the walls.

We use the computed centerline to discriminate various colon areas that are polyp candidates in order to be able to evaluate the accuracy of the polyp detection software module, such as that set forth in Summers et al. U.S. Pat. No. 6,246,748 issued Jun. 12, 2001 entitled Method for Segmenting Medical Images and Detecting Surface Anomalies in Anatomical Structures. Utilizing centerline information realized from the processed original image of the colon like surface, the software-detected polyps are compared with the human detected polyps to both establish efficacy of the disclosed technique and to render the disclosed non-invasive colonoscopy a useful tool for further colonoscope inspection and surgery. In most cases, comparison is based on the distance to and from the anal verge. These provided values are actually based on the length of the colonoscope at the moment of polyp detection.

DETAILED DESCRIPTION OF THE INVENTION

Figure 1:
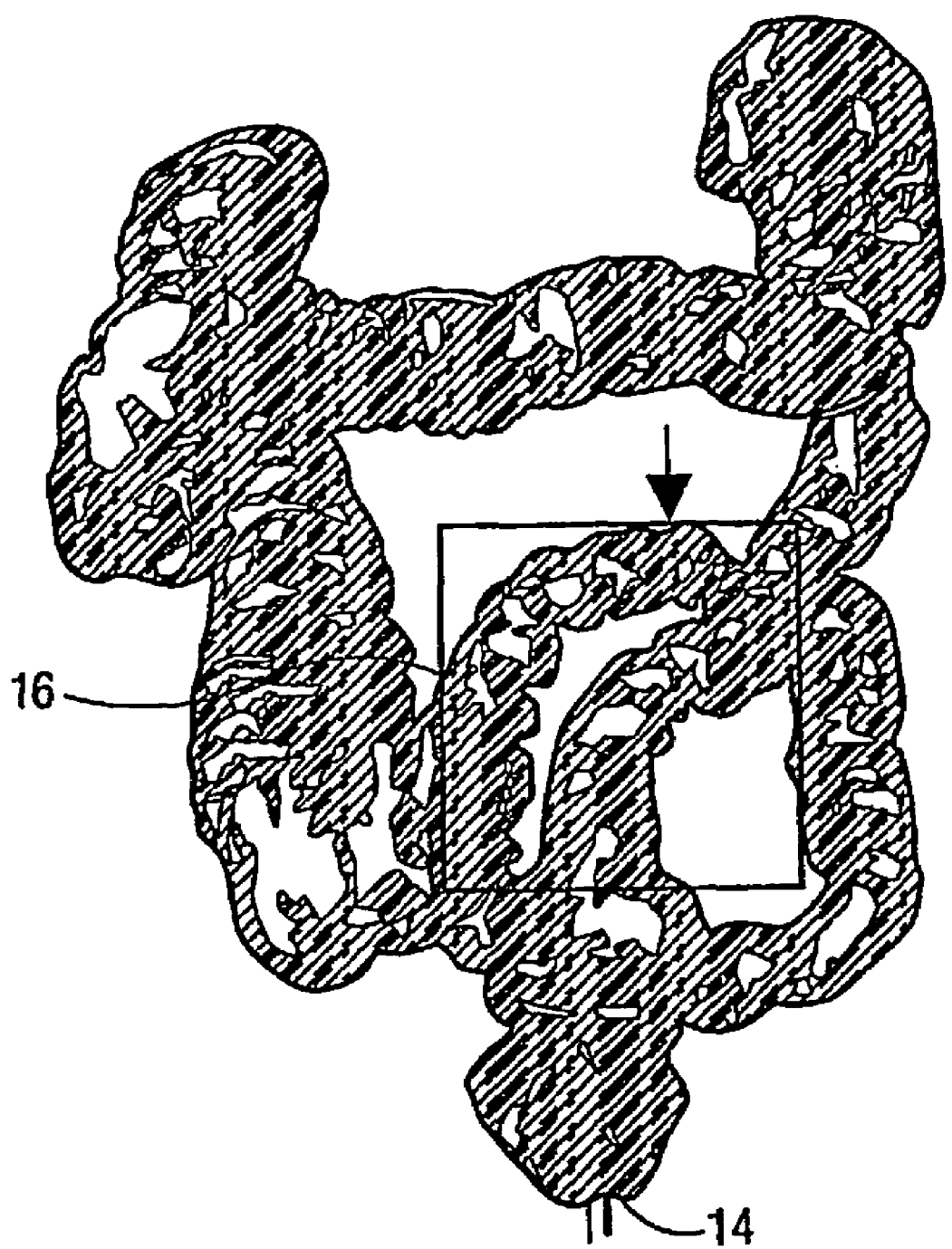
FIG. 1 is a perspective view of a typical human colon omitting related anatomy illustrating the exterior profile obtained by the disclosure of Summers et al. U.S. Pat. No. 6,246,748 issued Jun. 12, 2001 and entitled Method for Segmenting Medical Images and Detecting Surface Anomalies in Anatomical Structures.

Referring to FIG. 1, we assume the acquisition of a 3-D image of the colon like surface such as that disclosed in Summers et al. U.S. Pat. No. 6,246,748 issued Jun. 12, 2001 and entitled Method for Segmenting Medical Images and Detecting Surface Anomalies in Anatomical Structures. We are using the results of the module which process the CT slices and computes the 3D surface of the colon in accordance with that disclosure. In this view, the anal verge 14 and the cecum 16 can be seen at either end of the colon.

Having acquired such an image, our problem is: given the 3D surface of the colon we want to find an (ordered) set of 3D points which define the colon's centerline.

The method involves basic steps:

1) Compute a shrunken version of the colon. Basically the distances between vertices are iteratively averaged, the result being a shrunken colon. The shrunken colon is very thin and almost as long as the original colon.

2) Model the shrunken colon by an ordered group of 3D points along the major axis of the colon. We take equally distanced arbitrary vertices from the shrunken colon to form a curve consisting of an ordered group of 3D points. This curve is generally similar to but may or may not coincide with the major axes, or the ultimately computed centerline.

3) Using the curve of the connected 3D points, we generate equally distanced planes perpendicular to the curve to define equal length segments along the shrunken colon We map vertex points between these planes back to the original image of the colon to compute ring-like areas in the original colon.

4) Using the ring-like areas from the original colon, a centerline can be computed.

The indices of the vertices from the same segment are used to get a ring-like area "slice" from the original colon image. Any such ring-like area slice is processed to compute the local centerline point. It can be understood that the resulting points could be further used for computing better slices ("more" perpendicular on the centerline and more straight edged, smoothed or filtered centerline, etc).

The original (not shrunken) colon is thus sliced. Our method could be used to process any similar shape (twisted cylinder). The method does not need the original CT slices and it uses only the reconstructed 3D surface.

The results are based on colon versions with reduced-number of vertices. This permits us not only to reduce the total processing time but also to improve the algorithm performances. The shrunken colon model is accurate if the distances between points are much bigger (2-5 times) than the shrunken colon diameter.

To perform the shrinking step, the distances between vertices are iteratively averaged, the result being a shrunken colon. For the purposes of this disclosure,, the two terms are equivalent; colon shrinking is the same as colon averaging.

Figure 2A:
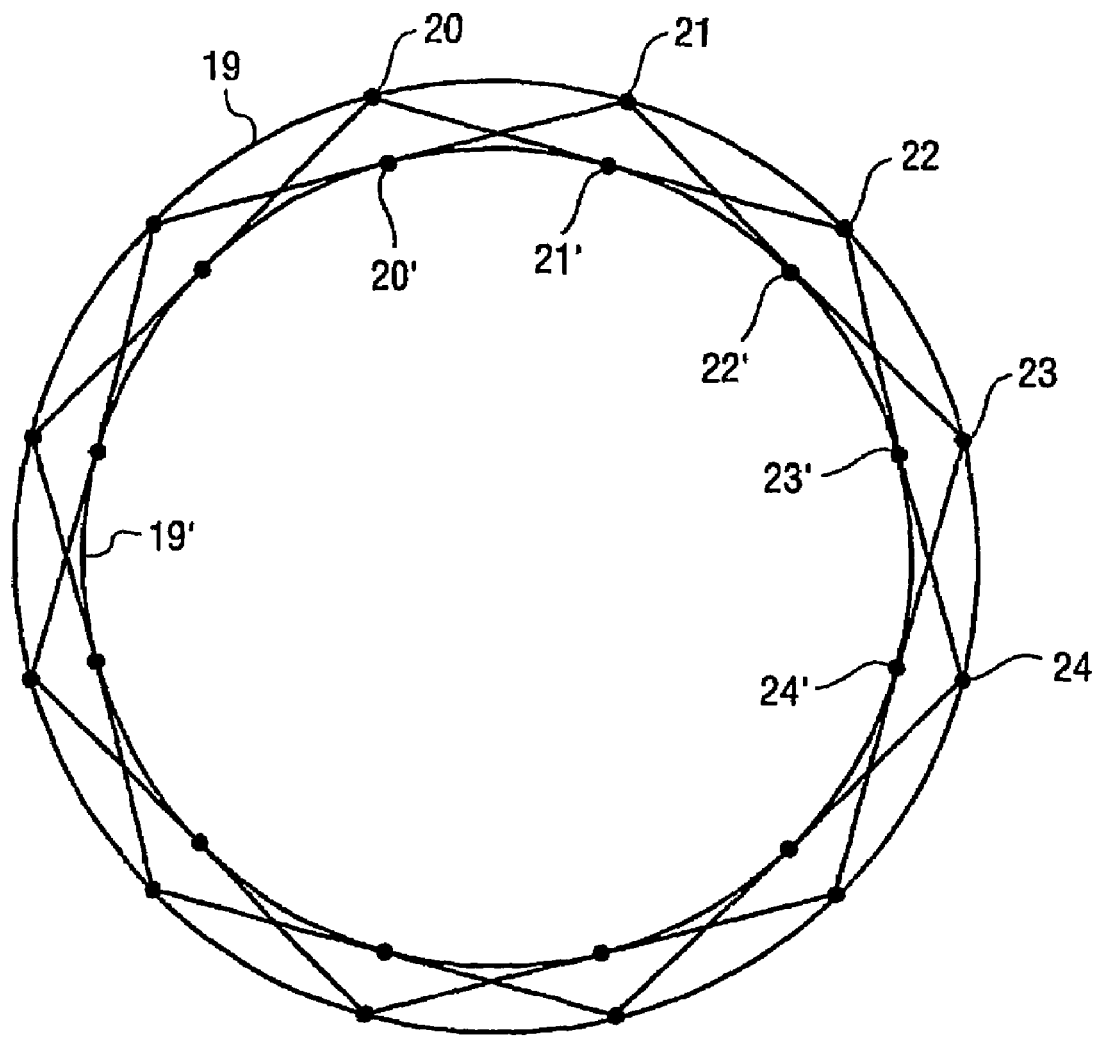
FIG. 2A is a two dimension plot of vertex points illustrated along a circular path illustrating shrinkage of the circle by the averaging technique of this invention.
Figure 2B:
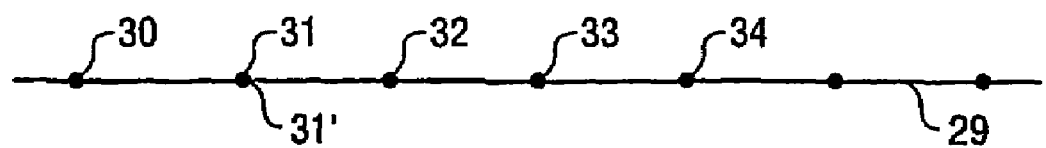
FIG. 2B is a two dimensional plot of vertex points illustrated along a linear path illustrating no shrinkage of the linear path by the averaging technique of this invention.

As will be explained later in this disclosure the "averaging" technique takes place in a three-dimensional basis. Referring to FIGS. 2A and 2B, a simplified explanation of the iterative averaging technique is offered in two dimensions utilizing for each averaging only two adjacent vertex points. While the reader will understand that the iterative averaging is three-dimensional and includes always more than two vertex points, the following examples are believed to be helpful.

Referring to FIG. 2A, a circle 19 having vertex points 20 through 24 is illustrated. So-called "averaging" of the two-dimensional positions of the vertex points 20 through 24 is disclosed. By way of example, the averaging position of vertex point 21 can be considered. Specifically, the actual two-dimensional position of vertex point 21 is ignored. Instead, in accordance with the averaging technique here disclosed, the new two-dimensional position of vertex point 21' is the average of the respective positions of vertex point 20 and vertex point 22. This results in the position of averaged vertex point 21' being on a chord midway between vertex point 20 and vertex point 22.

Proceeding further with the two-dimensional analogy illustrated in FIG. 2A, this procedure is repeated for all vertex points located around circle 19. The result will be a new set of vertex points 20' through 24'. When these points are all connected with a smooth curve, a new, smaller and concentric circle 19' will be generated.

It can further be seen that what has been described constitutes only one iteration. By conducting many iterations, circle 19 can effectively be shrunken to a point. Thus, using this simplistic example, one can understand how the essentially cylindrical section of a human colon can be "shrunk."

Referring to FIG. 2B, a straight line 29 is shown having vertex points 30 through 34 along its length. The same averaging technique is applied. For example vertex point 31 has as its new position the average position of its vertex neighbors 30 and 32; this "new" position is labeled as vertex point 31'. It is immediately seen that the position of vertex point 31 and vertex point 31' is identical.

Thus the reader will appreciate that line 29 does not shrink.

In what follows, we will apply this illustrated two-dimensional technique to the three-dimensional image. Further, it will be understood that "average" positions will constitute three-dimensional average positions selected from many more than just two neighbors. Remembering that the serpentine colon is elongate along a major axis but generally irregularly cylindrical in shape, the reader can be given an intuitive understanding of why the iterative averaging process of this invention results in the shrunken colon having the same length but considerably reduced in diameter.

It further will be remembered that each vertex point has at least two information sets. One of these information sets is a discrete identifier for each vertex point. This discrete identifier for each vertex point is not altered as a result of the shrinking process. The other of these information sets is the three-dimensional position of the vertex point. This information set is altered as a result of the averaging process.

The disclosed "shrinking" causes all of the vertex points to move to and towards the major axis of the colon.

Having given an oversimplified example of the averaging technique, a more technical description will be offered.

The pseudo-code for one iteration is:

TABLE 1

| STEP | Description |
|---|---|
| 1) Take neighbors of Vi | |
| 2) Average their coordinates. | Get averageX, averageY, averageZ |
| 3) Assign Vi the above computed coordinates: | Vi. X = averageX; Vi.Y = averageY; Vi.Z averageZ |

Figure 3:
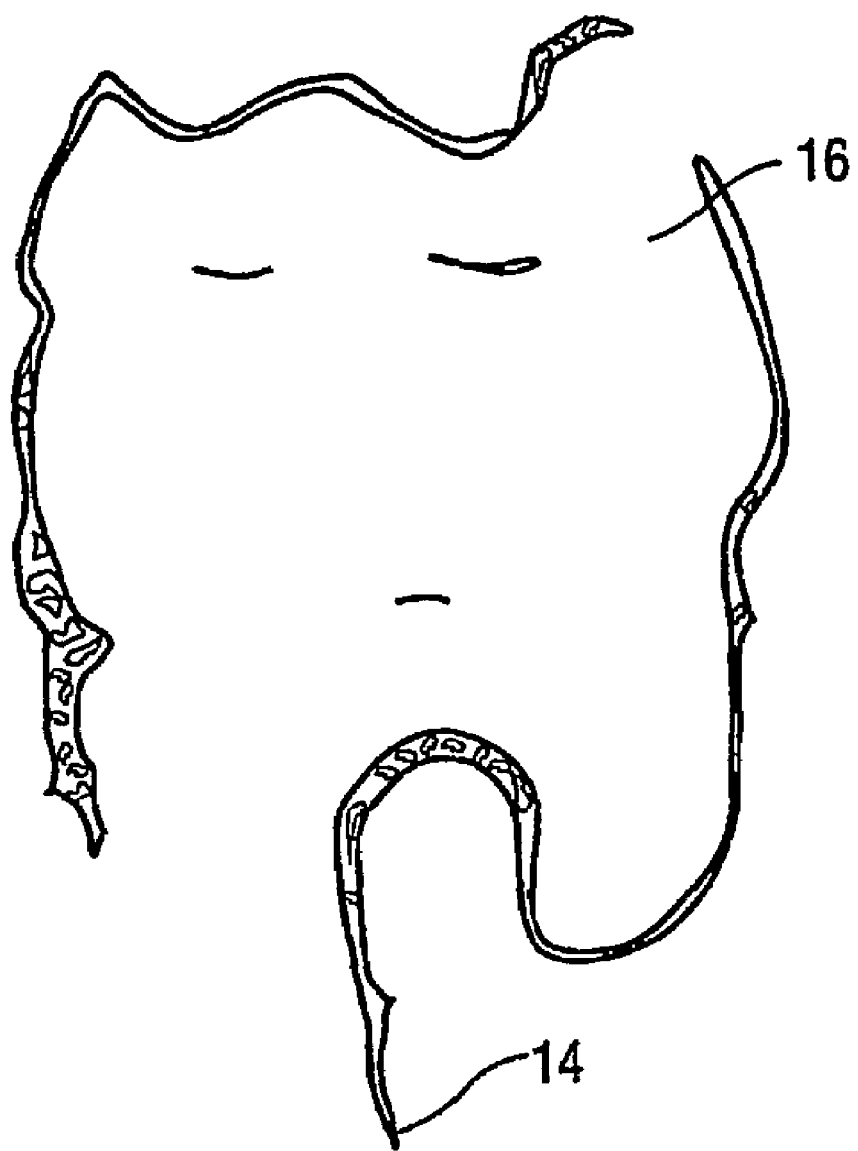
FIG. 3 is the colon of FIG. 1 having been shrunken by "neighbors averaging" with about 250 iterations.

All the operations from Table 1 are repeated for all the vertices of the surface for a certain number of times. FIG. 1 presents a 3D surface of the human colon. FIG. 3 presents the same surface shrunken 250 times.

There are two important side effects of averaging:

1) Thinning of the whole shape; and,

2) Compression of the whole shape (its bounding box is smaller than the original shape).

It is important to note the effect of thinning is more important than that of compression.

Figure 4:
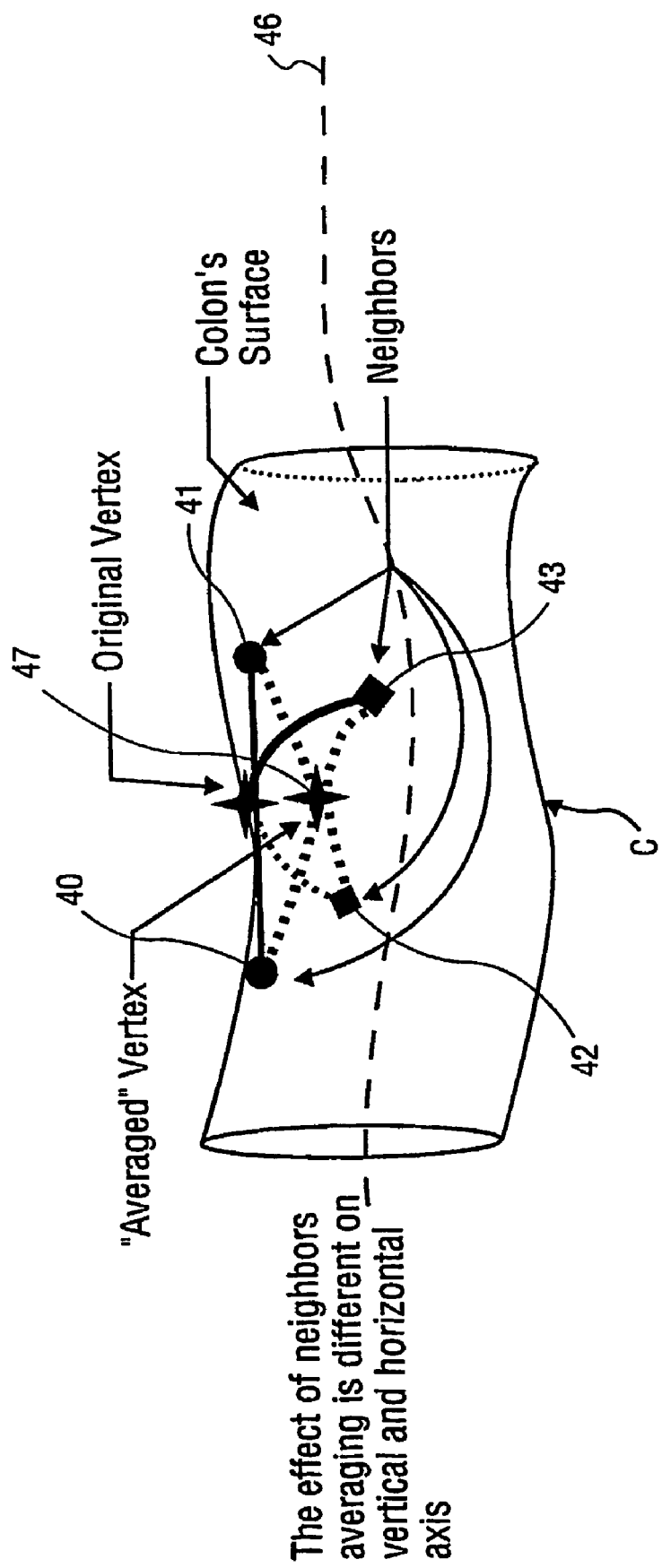
FIG. 4 is a schematic of a three dimensional "neighbors averaging" illustrating the alteration of three dimensional position of the vertex points along a length of a colon having its local major axis oriented horizontally.

Attention is directed to FIG. 4. In this example, the position information of a vertex point is altered utilizing the average positional information of its "neighbors." Thus, the alteration of the positional information of the vertex points can be referred to as "neighbors averaging."

As shown in FIG. 4, the contribution of round neighbors 40, 41 (which are "at the same level" as the current vertex) to the vertex 47 movement is less significant than that of the other two vertices (displayed as squares 42, 43 and which are lower than current vertex). Observing FIG. 4, the section of the colon C illustrated is elongate (has its major axis 46) in the horizontal. The horizontal change in position due to neighbors averaging is not significant; a larger change of position is obtained perpendicular to the major axis, here on the vertical axis.

If the iteration process is extremely long it is possible to obtain a straight line.

The size of the movement depends actually on the curvature of the surface; points with greater curvature tend to move more. This is helpful because by shrinking we actually want to obtain a thin and twisted surface not a collapsed shape. The reader should understand that the shrunken colon is not used as the centerline of the normal colon.

Figure 5:
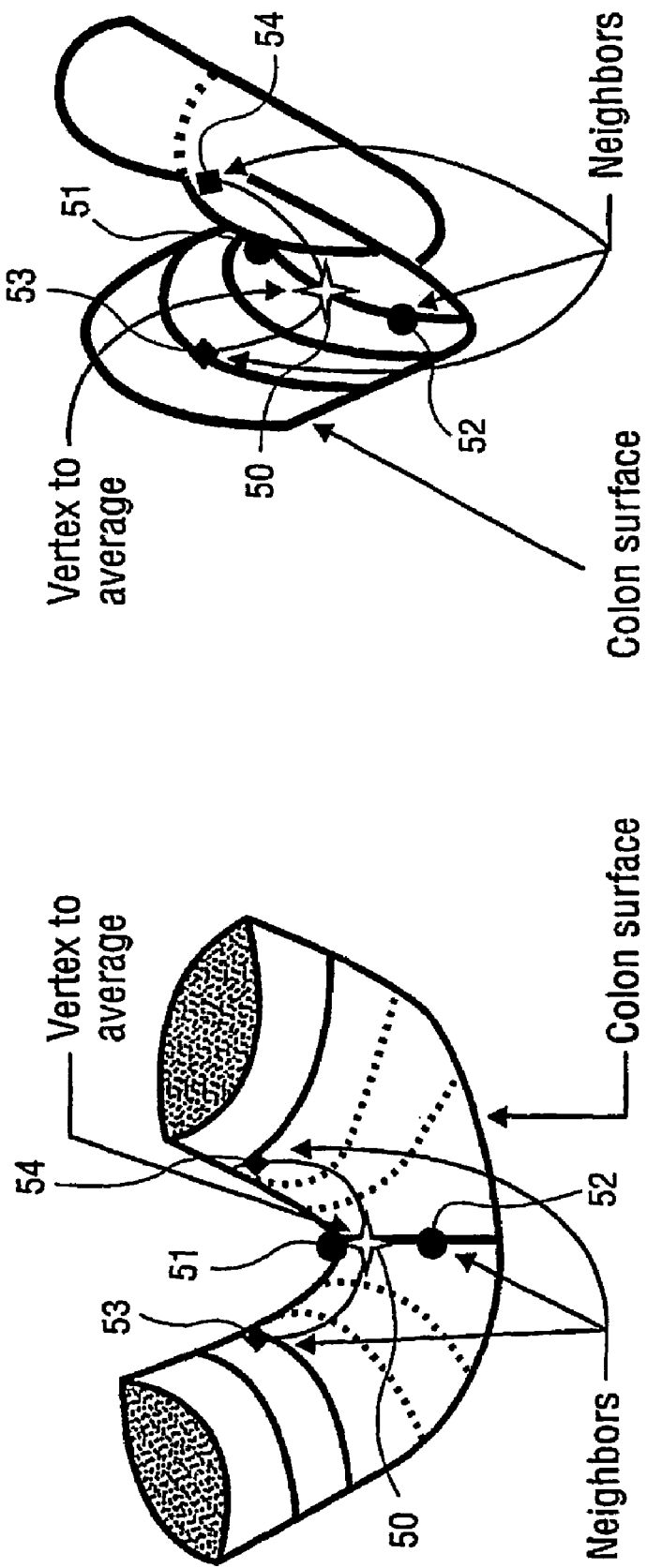
FIG. 5 is a schematic of a three dimensional "neighbors averaging" illustrating the alteration of three dimensional position along a length of a colon having its local major axis undertaking relatively large curvature.

Referring to FIGS. 5A and 5B, it will be seen that the averaging technique of this invention does result in some shortening of the length of the colon. Points on the tight loops of the colon relative to the major axis present big curvatures. Thus points 53, 54, will tend to cause point 50 to move away from and even outside of the original surface of colon C. Points 51, 52 will tend to cause point 50 to move toward the inside of the colon C. Other points on the outside of the curvature of colon C will move toward the inside of the colon.

Table 2 shows some values of the colon bounding-box (normal and shrunken version):

TABLE 2

| Colon | type | Xmin (cm) | Ymin (cm) | Zmin (cm) | Xmax (cm) | Ymax (cm) | Zmax (cm) |
|---|---|---|---|---|---|---|---|
| 1 | normal | 9.94 | 11.91 | 4.00 | 36.88 | 32.59 | 47.40 |
|   | thinned | 10.43 | 13.86 | 5.20 | 35.89 | 30.89 | 44.22 |
| 2 | normal | 8.81 | 11.26 | 3.98 | 33.67 | 34.16 | 45.90 |
|   | thinned | 12.19 | 14.43 | 8.09 | 30.16 | 31.43 | 41.94 |

We can see that the variation of the bounding box is not as important as the thinning effect. For example, for colon 1, the "X" variation is:

$$(35.89-10.43)/(36.88-9.94)=25.46/26.94=94.5\%$$

The second step is to get a model of the shrunken colon. Our aim is to obtain a set of 3D points that should approximate the shrunken colon. These points will be used in the next step, when we want to get ring-like areas of the colon surface and use them to compute the centerline.

We use this ordered set of 3D points to reduce the number of vertices processed. The ordered set of 3D points is spline interpolated and the control points are used to compute rings. We define a ring as a cylinder-like portion of the shrunken colon whose axis is more or less parallel with the colon model or colon centerline.

A fundamental assumption for our algorithm can be stated: the shrunken colon centerline and its model are almost the same. This is true if the shrunken colon is thin and the distance between model points is bigger (2-5 times) than the shrunken colon diameter.

We now model the shrunken colon by an ordered group of 3D points along the major axis of the colon in accordance with the second step of our procedure.

Figure 6:
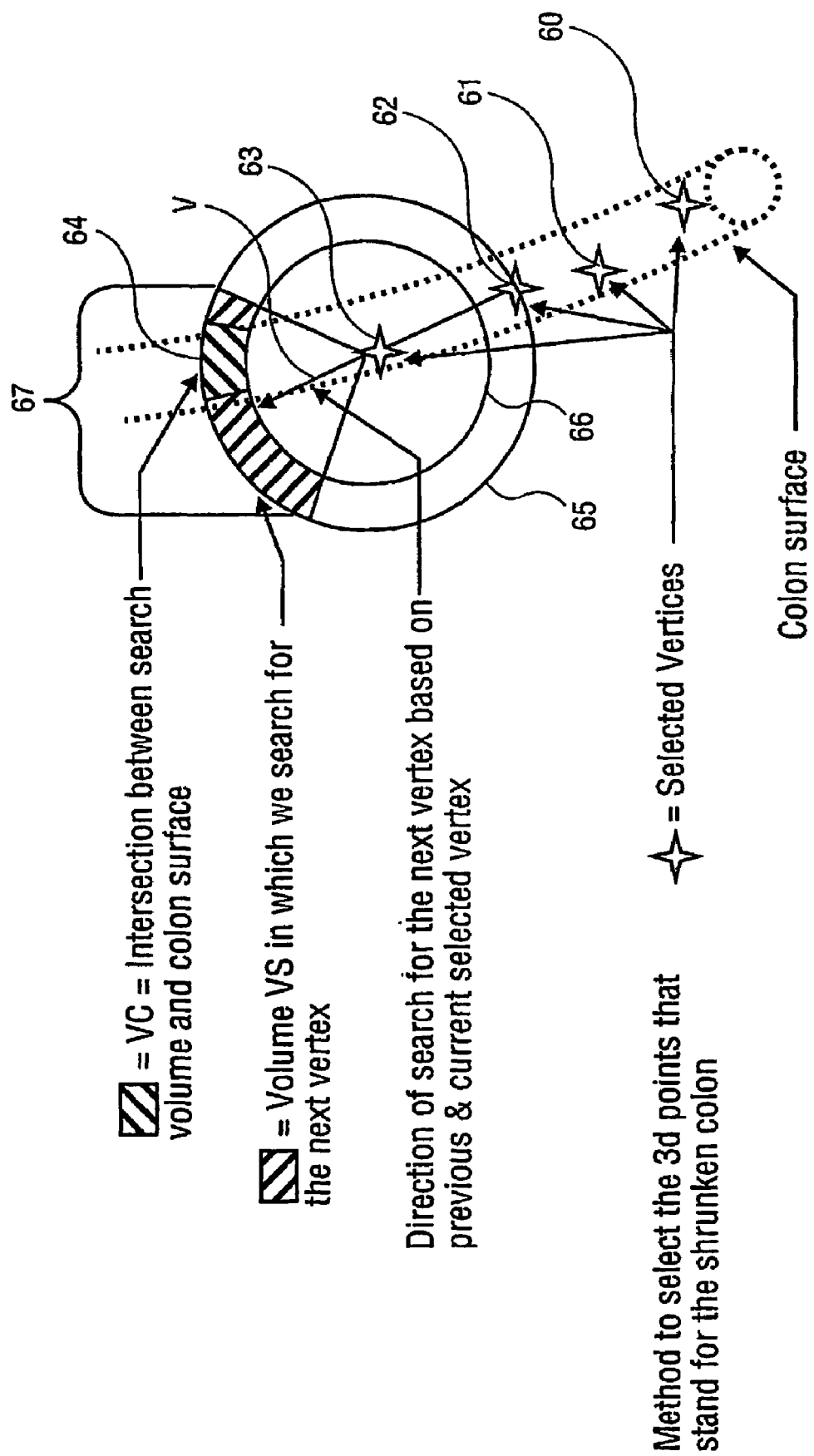
FIG. 6 is a schematic of vertex points taken along a shrunken colon illustrating how previous selected random vertex points generate both a position or origination of a vector and a search volume defined about the vector to enable selection of the next random vertex point along the length of the shrunken colon.

Referring to FIG. 6, the algorithm to extract the points is quite simple:

We start with some random vertex point 60 located at the beginning of the shrunken colon. An easy area to select a random vertex point is the rectum because of its uniform location and more or less uniform direction with respect to any image of the colon. We select a first random vertex point on the rectum. The next random vertex point 61 selected is a vertex point that is located at a preselected distance D from the first random vertex point. This second vertex point and the first vertex point define a three dimensional direction or vector V. We use this vector from the second vertex to choose the new (third) vertex point 62.

From now on, every time we want to choose a new vertex we do the following:

compute the new direction or vector (direction=current vertex−previous vertex);

define a search volume VC (see FIG. 6). This volume is the intersection between (see FIG. 7A):

the sphere 65 centered in last chosen vertex and having a radius equal to the largest preselected distance allowed between two consecutive vertices;

the sphere 66 centered in last chosen vertex and having a radius equal to the smallest preselected distance allowed between two consecutive vertices; and, the solid angle 67 central to the vector defined by the previous and current vertex.

The solid angle could be even more than half a sphere. We use a large solid angle only to ensure the vertices are following the shrunken colon. If we do not use the vector V to define the spherical segment for search, it is possible to return back and select one of the previous vertex's close neighbors (or even the previous vertex itself). In such case it is possible to enter an infinite loop and never be able to end the colon processing.

It will be understood that the solid angle should be as big as possible (even bigger than half a sphere) to ensure the proper track.

Vertex choosing is random but nevertheless confined to a path generally along the major axis of the colon. The first vertex that happens to "be" within the correct search volume (VC) is chosen to be the next vertex.

Our implementation uses typically a two dimensional search angle whose cosine minimum value is between (−0.2; 0.2). This means we are considering angle ranges from (−102°, +102°) to (−78°, +78°). See Table 3: min(cosine)>−1 is the lowest possible value ⇔maximum angle range: −180° to 180°.

TABLE 3

| Search Angle Values | min (cosine) | Range (degrees) |
|---|---|---|
| Maximum range | −1 | (−180°, +180°) |
| Range 1 | −0.2 | (−102°, +102°) |
| Range 2 | 0.2 | (−78°, +78°) |
| Minimum range | 1 | (−00, +0°) |

Figure 8:
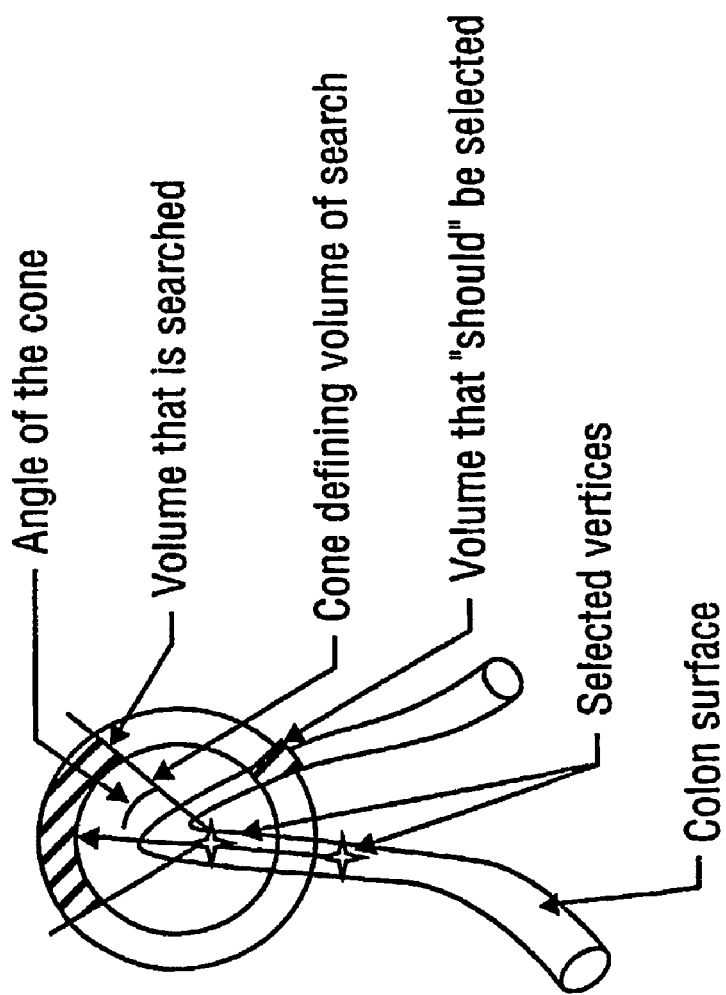
FIG. 8 is a schematic detail illustrating the difficulty of tracking random vertex points where the colon-like surface being tracked undertakes a sharp bend.

The low limit value depends also on the shrunken colon diameter. In order to be able to follow every colon bend, we need the solid angle to be as large as possible (see FIG. 8). If we take the maximum angle range, we risk tracking the colon incorrectly (and/or enter a infinite loop so that we'll never be able to finish data processing).

Figure 7A:
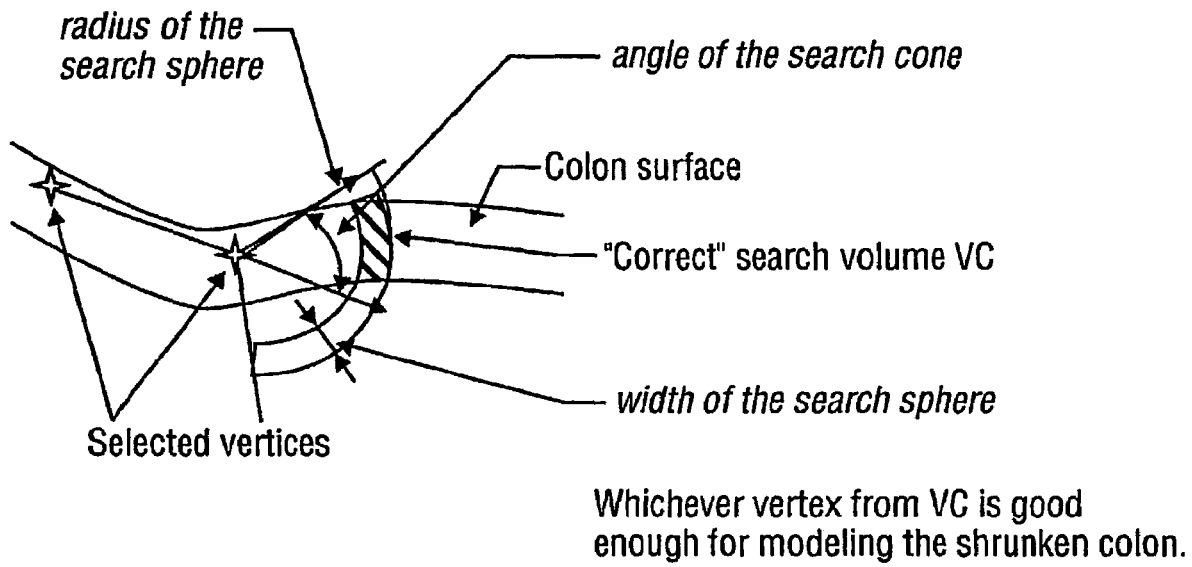
FIG. 7A is a schematic of a search sphere segment taken along a solid angle generated from a vector defined by two previously located random vertex points.

In FIG. 7A, we displayed a situation when the value of 102° is not good (it is too big). The solid angle delimited spherical segment complies with our search conditions but is obviously not desired. Usually this situation doesn't happen because the ratio (distance between two vertices)/(shrunken colon diameter) is much larger. Ideally this ratio should be very large (in the range of 5-100), as we want the shrunken colon to be very thin. We have had success with the user selecting the value of the solid angle. For most colons, an angle of 102° was sufficient.

The last step is to use the shrunken colon model to compute the centerline of the real (not shrunken) colon.

Reviewing the disclosure thus far, we have the original colon, its shrunken version and a model of it (an ordered set of 3D points or a curve). We need to determine an ordered set of points that should stay inside the colon. This set of ordered points should model the centerline of the colon like surface. For our purposes (polyps candidates discrimination in terms of their distance from origin), it is not necessary that the centerline be really "central" (provided this could be accurately defined). In general (for example to generate a "fly" path through virtual colon) if the centerline stays inside the surface of the colon, this is enough.

Figure 9:
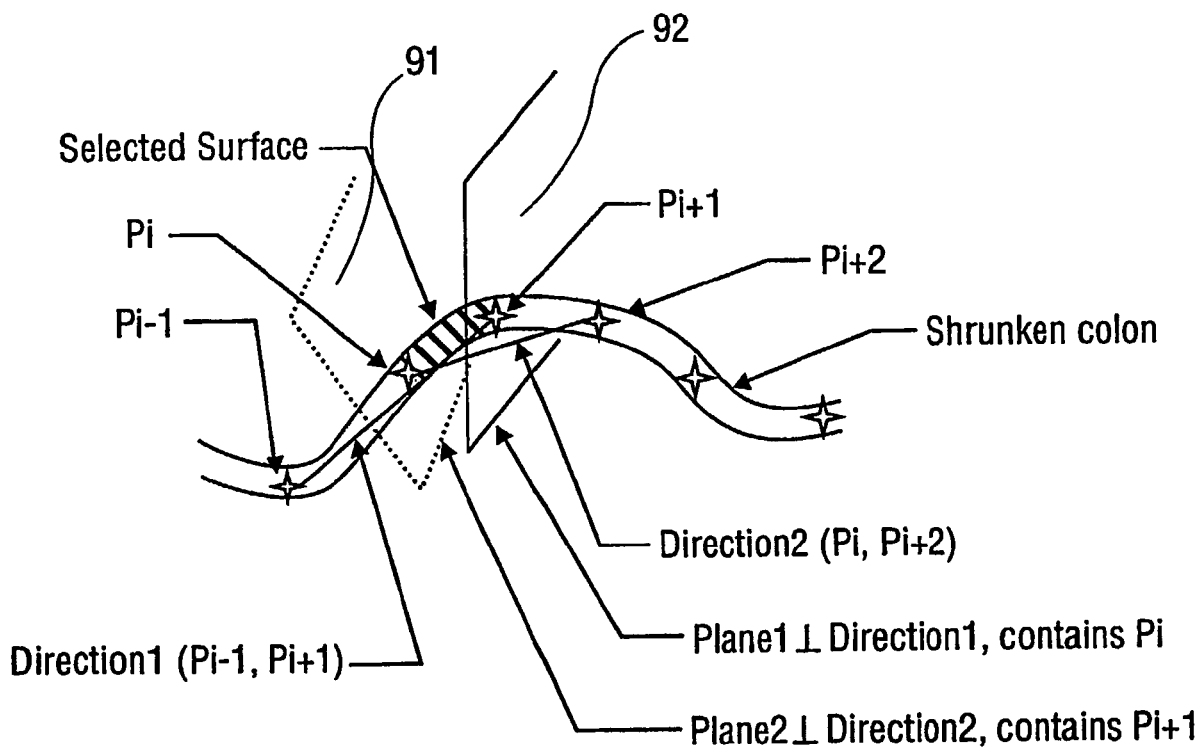
FIG. 9 is a schematic diagram illustrating the construction of planes normal to model curve, and passing through points in the curve constructed from randomly determined data points along the length of the shrunken colon to separate out those vertex points local to a ring segment of the colon.

With reference to FIG. 9, the main steps are:

For each Pi of the model

Figure 10:
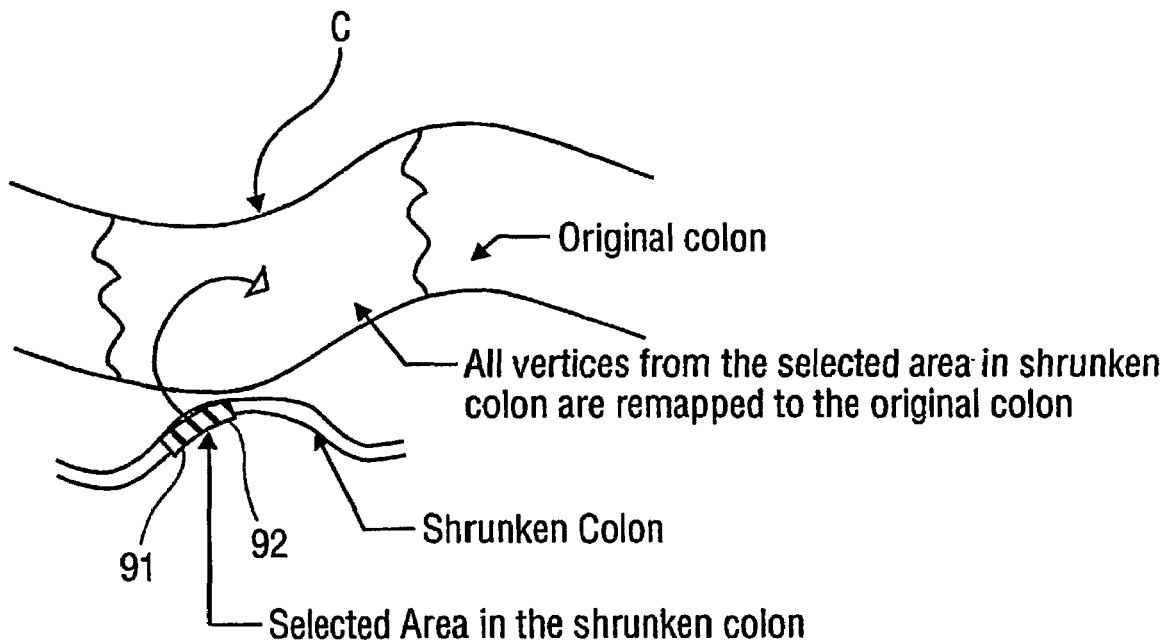
FIG. 10 is a schematic illustrating vertex points from between two planes taken in FIG. 9 being mapped to the original image of the colon.
Figure 11A:
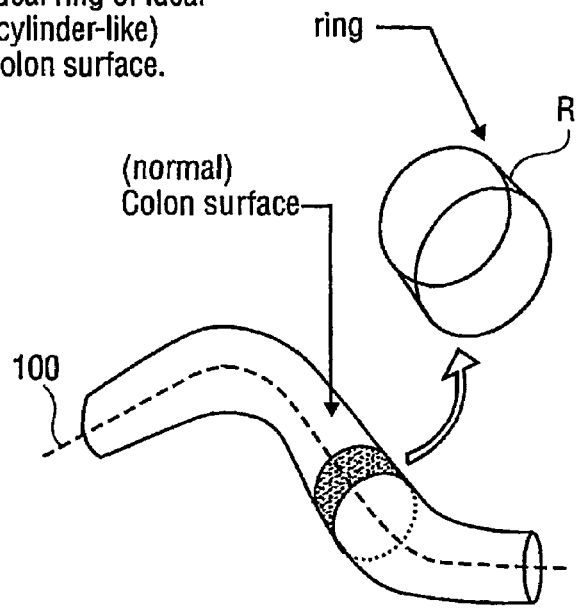
FIG. 11A display a ideal ring when the colon is ideal—a twisted cylinder and 11B illustrates the real situation when the rings are not small cylinders. We also suggest another technique, simpler but different than averaging technique that is used in our implementation, for determining the centerline of the colon in the real situation: we can compute the centerline point using the center of the bounding box of the rings.

Take point Pi and Pi+1 of the model;

Compute the two planes 91, 92 perpendicular on the shrunken colon model (which model is actually a curve). The two planes are computed so that each of them passes through one of the corresponding points Pi and Pi+1. (see FIG. 9);

Select all the vertices between these two planes 91, 92 that belong to the shrunken colon;

Map these vertices to the original colon C. Thus and referring to FIG. 11A, we get vertices that are grouped in ring-like areas R ring that are perpendicular on the major axis 100 of the shrunken colon; and, Process these vertices (for example average them or compute the center of their bounding box 101) (FIGS. 10 and 11).

As a primary matter, it can be seen that we have developed a new method to "segment" cylindrical shapes of an irregular cylindrical surface, here the human colon. It can be used in general in image segmentation (2D, 3D, etc) and provides an easy and efficient way to process the colon. To get the centerline we can use any method to process the resulting slices. Further, we can obtain a point or a segment of line 102 to uniquely identify that slice. The resulting points or line segments define the desired centerline. Our needs require mapping distances determined back to the actual use of the colonoscope (polyps discrimination in terms of their distance from the rectum for example).

We have run a software program based on the technique here displayed. This program was run on a Dell Optiplex GX 1p PC with the features described in table 4:

TABLE 4

| Processor | Frequency | Operating System | Bus frequency | Memory (RAM) |
|---|---|---|---|---|
| Intel Pentium III | 550 MHz | Windows NT 4.00 | 100 MHz | 255 MB |

4.1 Shrinking

Shrinking the colon is vital for the whole algorithm. Typically a colon surface has 300000-500000 vertices. Averaging such a great number of vertices for 1000 times is very time consuming. For example if the number of vertices is 350000 and number of iterations is 1000 we have 11 seconds/iteration*1000 iterations=11000 seconds (almost 180 minutes=3 hours) only to shrink the colon.

Also, due to the huge number of vertices, after 200-300 iterations, vertices are very close one to another. Further averaging does not generate appreciable three dimensional movement. This means that the effect of colon thinning is reduced (especially in the rectum and cecum—which are usually thick). The differences between 1000 iterations and 2000 iterations are small.

It will be appreciated that we do not need all the vertices supplied from an image of the colon shown in FIG. 1 to compute the shrunken colon. Therefore, before shrinking we preprocess the 3D colon surface by decimating the vertex points comprising the image of the colon. For example, we prefer to reduce the number of vertices composing the surface by as much as 80%.

Using a decimated colon image (65000 vertices instead on 350000), the average time per iteration is under 0.5 seconds (typically between 0.1-0.3 seconds), which leads to an average total time of 3 minutes per 1000 iterations. This time can be further improved by increasing the number of decimated vertices. If we are using ⅕ of the total number of points even the colon looks nice.

4.2 Interpolation

Since the shrunken colon is smooth, we are using spline functions to interpolate the first approximation. The interpolated points are then used to get the get the slices in the shrunken colon and in the original colon. Final points are again interpolated (using splines) in order to provide a smooth curve inside the colon. This last step (interpolation in normal colon) is not necessary—it was implemented only to provide "nicer" (smoother) curves. This could be useful, however, in virtual navigation—allowing a small image variation between two navigation points.

4.3 Shrunken Colon Approximation

Figure 7B:
FIG. 7B is a schematic on a reduced scale illustrating the location of the random vertex points along the length of the shrunken colon.

The main parameters that control this stage of processing are (see FIG. 7B):

vector of the solid angle for the next vertex;
segment of the searched sphere delimited within the solid angle; and,
radius of the searched sphere.

Typical values are summarized in table 5.

TABLE 5

| Radius | Width | Angle (min value of cosine) |
| --- | --- | --- |
| 0.7 * Az/20 | 0.4 of radius | −0.2 < min cos < 0.2 | where:

$Az=Zmax-Zmin$=amplitude of the whole colon on z axis (see FIG. 11 and table 2); and,
Radius is expressed as a fraction of $Az/20$ where 20 is an empirical value.

The above value ($Az/20$) is chosen for the following reasons. In order to minimize data processing, we implemented a "locality" mechanism. We sort our vertices based on their Z coordinate (see FIG. 12). The total number of classes is 20 and each i-th class contain vertices whose Z coordinate is between $i*Az/20$ and $(i+1)*Az/20$ (+Z mm) where $i=0 \ldots 19$ (see FIG. 12). 20 is an empirical value and is based on the general features of the colon. If the processed shape is more twisted this value can be increased. Actually what matters is how tight are the loops of the shrunken shape: the tighter the loops are, bigger the number of classes.

Figure 12:
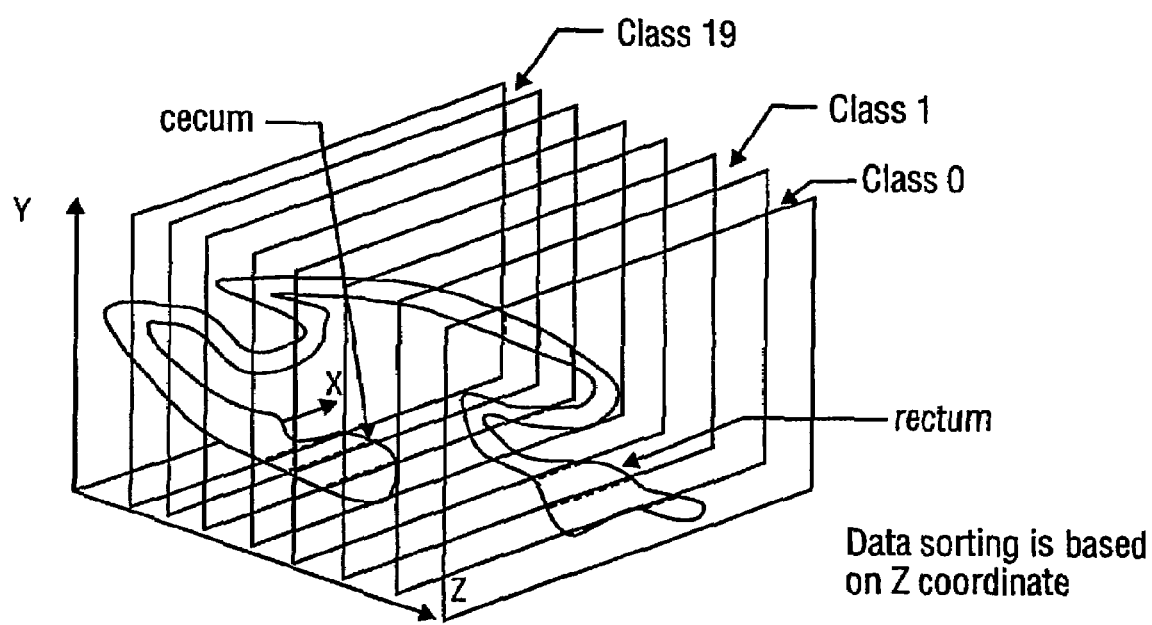
FIG. 12 illustrates a coordinate Cartesian coordinate convention superimposed upon a typical human colon; and, FIG. 13 is a schematic illustrating a colon stretched along a linear path.

Referring to FIG. 12, classes are used to minimize the number of searches. For every vertex in class i we search the vertices in class i, i-1, i+1. If the total number of classes is 20 we reduce our searches by almost 85% ((20-3)/20=17/20=0.85—provided each class has the same number of points). Of course the classes have different number of vertices (for example class 0 includes only a fraction of rectum vertices) but the principle is good and it could even be increased on the X axis (defining a rectangular grid).

The shrunken colon is limited to a k*20 maximum number, where k is again 20 (and again empirical), which means no more than 400 points. These points are interpolated, introducing 3 new points between each 2 old points, and we obtain (400−1)*3+1 total numbers for the shrunken colon. These (almost) 1200 points generate 1200 points in the original colon, which in turn are again interpolated. Finally we have a centerline composed of maximum (1200−1)*3+1 values=cca 3600. We never obtain such big values, typically the centerlines are modeled by less than 1000 points (500-900).

The colon thickness (diameter) is also important. If this is not small the approximating line will be twisted and the slices will not be processed accurately.

One solution is to increase the shrinking (either the number of iterations or the number of decimated vertices). Another solution would be to provide an adaptive sphere radius, function of the colon diameter. This could be made either automatically (compute somehow the colon diameter) or using some a priori known information about colon shape (radius bigger at the beginning for the rectum and at the end for cecum, since these are usually the biggest segments of the colon). We are using the first solution in our algorithm. If, at the beginning, we were using 500 iterations to shrink, finally the value of 1000 proved to be enough for our needs.

Another solution would be to increase the volume/surface averaged (considering not only the corresponding ring but also a part of the previous and next ring) in the original colon again on some a priori known areas where the colon diameter is usually big. We are using this actually on the whole colon in order to obtain a smoother centerline that models the colonoscope.

4.4 Computing Slices in the Original Colon

Using the points that approximate the shrunken colon is easy to determine slices (rings) as thick as we wish which are perpendicular on the shrunken colon centerline. Actually the main idea behind the shrunken colon is that the shrunken colon model and its centerline are almost the same. This is true because the shrunken colon is very thin and smooth, unlike the normal colon.

Importantly, our method enables us to determine the vertices of the shrunken colon that belong to a certain slice (or ring) and then find their matching vertices in the original colon. These new vertices (from the original colon) form a ring that is more or less perpendicular on the colon centerline. The edges of this new ring (on the original colon) are not sharp (see FIGS. 11A and 11B) but we can take this ring as thick as we wish.

All the values that right now are manually adjusted for each colon can be fully determined function of the local features of the colon (diameter).

The whole process described above (excluding shrinking) takes less than 3 minutes (almost 2 minutes for a 65000 vertices colon).

Figure 13:
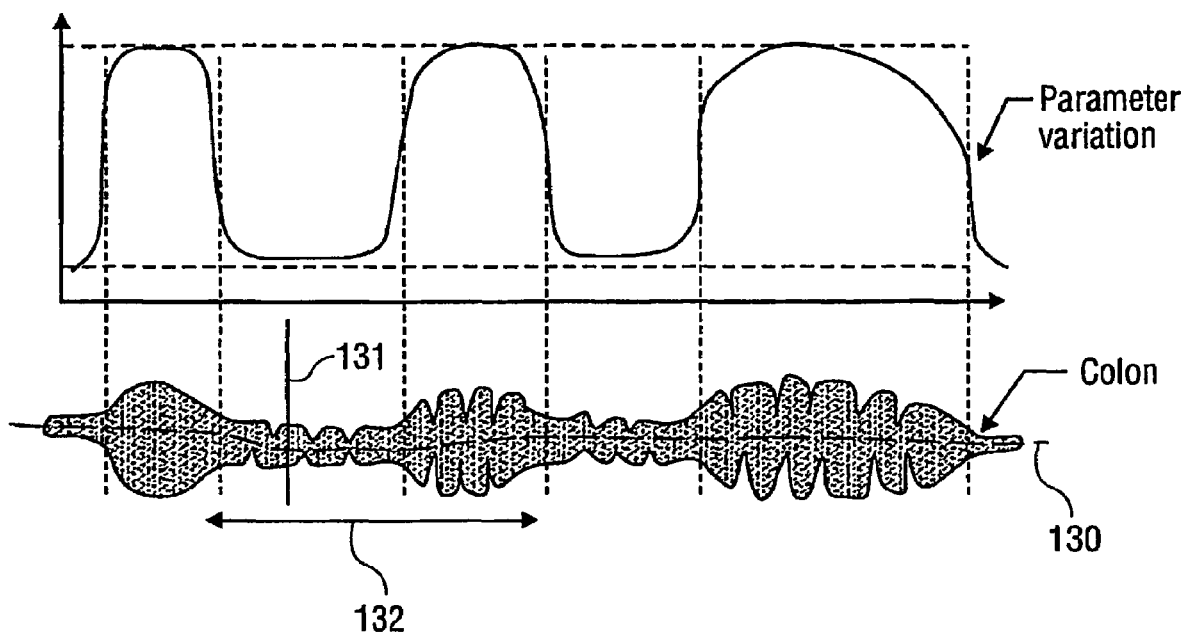

The computed slices can be further processed if we want an even more accurate centerline. Provided the slices are thin, a possible projection on a plane perpendicular on the above computed centerline can be used as illustrated in FIG. 13. In order to obtain an individual shape, we will need to re-index all the vertices. However such a 2D image can be processed easier to obtain a better approximation of the centerline.

Figure 11B:
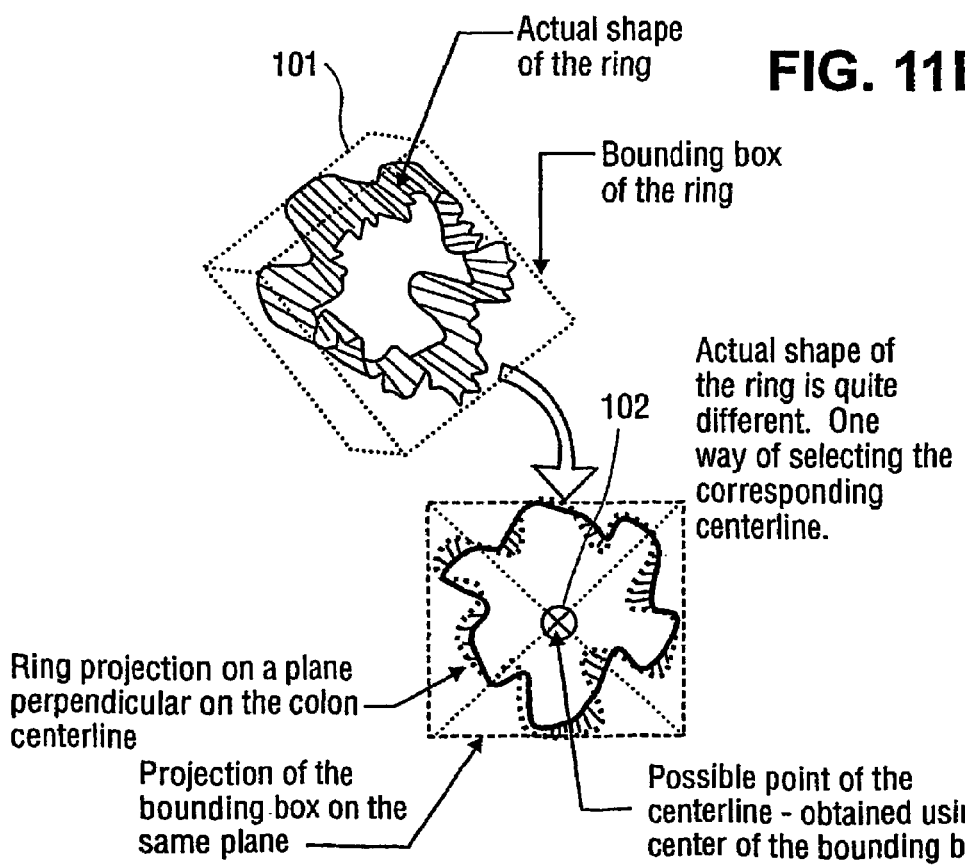

For example in FIG. 11B, we suggest taking the center of the bounding box while in our algorithm we use the average of all vertices (which may not always be inside the colon). In our program, using averaged thick cross-sections of the shrunken colon, we were able to obtain centerlines that reside completely inside the normal (not shrunken) colon.

It will be understood that our algorithm uses only the 3D surface, it does not need the original CT images. Also it uses the coordinates as they are, as float numbers. The data does not need to be presented as a 3D rectilinear grid. This is one of the big differences comparing with other techniques. We are using vertices connectivity (vertex neighbors) and local vicinity. The resulting centerline is continuous and is interpolated using spline functions.

The algorithm is "open" which means it can be improved using different techniques. The algorithm has basic steps and each one (or at least parts of them) could be changed and re-implemented using better approaches. For example, at some point we manage to get a cross-section of the colon. For each cross-section, a number of vertices form a "cylinder" whose axis is on the colon centerline. We average all these vertices to compute one point on the centerline.

It will be understood that we could use here any other method to compute the center line point: center of the bounding box, axis of the approximating cylinder computed using minimum of total square error, skeletons and so on.

The technique is fully automated. All the parameters have empirically defined values and for normal colons user interaction is not necessary. However if the colons are collapsed (sometimes the CT segmentation module fails to determine the colon boundaries), or data acquisition has gaps, sometimes the shrunken colon modeling stops before the colon end (before the cecum). In such cases we need user interaction (modifying search sphere radius and solid angle) in order to be able to cover the whole colon.

The technique is relatively quick. Total average processing time is 5 minutes, from the original decimated surface to the ordered set of 3D points of the center-line, all the processing being done on a modest machine—Intel Pentium III PC, 550 MHz (see table 4). It can be further improved increasing the decimation degree for example.

Another important advantage of our technique is that it already provides virtual fly-path elements (actually these elements are obtained before computing the centerline). The rings computed (slices in the original colon) are used to determine the centerline points but their projection on a plane perpendicular on their axis actually defines what the user wants to see during virtual navigation.

FIG. 11B shows also that, for virtual navigation purposes, the errors involved in centerline computation (if it stays or not inside the colon) don't affect the navigation accuracy. Using the slice's bounding box, we can provide an accurate and helpful image sequence (which is actually equivalent to considering the bounding box center as the centerline point).

Our method is simple. All the steps presented above are only logically separated. Their implementation is quite simple. Although the complete program (written in C/C++) takes more than 1000 lines, the most important parts (shrunken colon modeling, vertices re-mapping etc) are simple functions.

Referring to FIG. 13, given a colon-like surface, we developed a method to obtain its centerline and to split the surface in slices perpendicular on its centerline. In FIG. 13 we show the colon centerline linearly disposed and how the parameters should be adapted to local conditions (in this case—local diameter) in order to increase the degree of automation of the whole process.

Centerline is a vital parameter for any CAD (Computer Assisted Diagnostic) tool. For example, a navigation path to display a 2D map of vertices' distances to the centerline could be generated. Observing asymmetries in the continuum of successive ring structures could improve polyp detection.

Another application of out method is computing whole colon volume and local colon volume: the simplest way to do this would be to consider very thin slices, compute their area and compute local volume by multiplying each ring area by its height. Adding all these volumes (of all the colon rings) gives us the whole colon volume.

Figure 14:
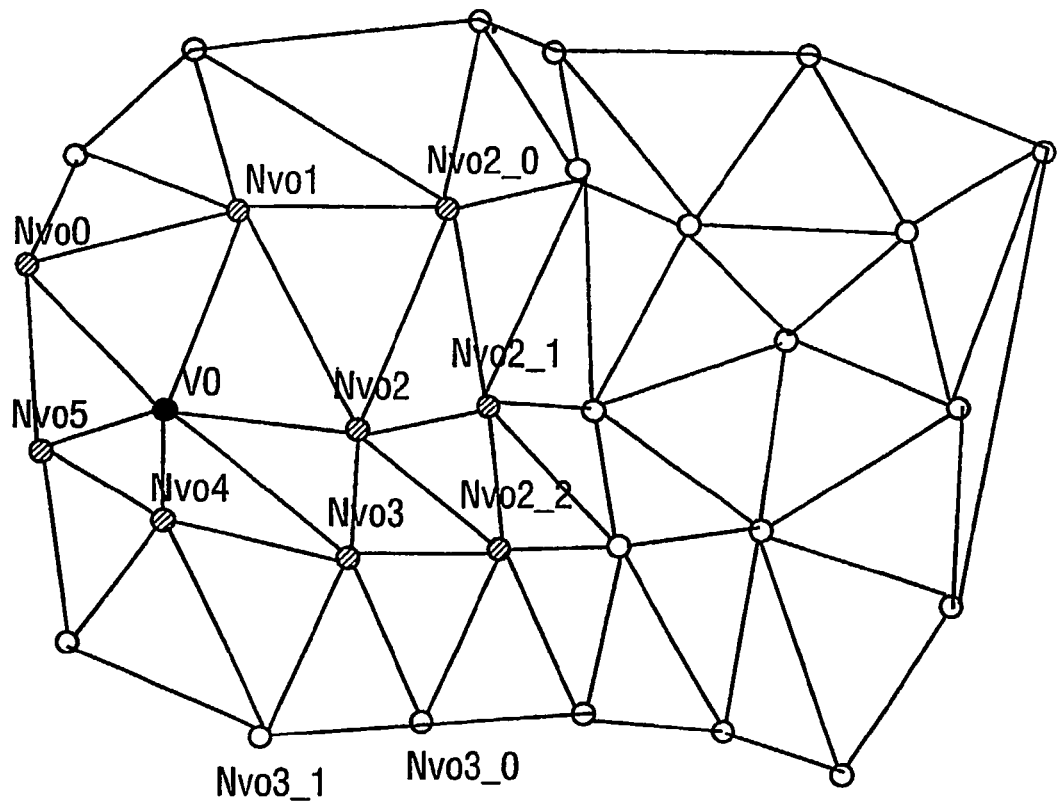
FIG. 14 is a schematic of a thinned colon image illustrating the selection of a random vertex point VO illustrating successive identification and marking of the neighboring vertex points with propagation occurring generally from the left to the right of the illustration; and, FIG. 15 is a schematic of a thinned colon image illustrating designation of a random vertex points from an initially selected first random of vertex to both colon ends.

Referring to FIG. 14, a random chosen selected modeling vertex point V0 is designated along the colon length, the point here being adjacent one end of the shrunken colon image. The reader will understand that this image point could be chosen anywhere along the length of the shrunken colon image—it does not have to necessarily be adjacent one end of the colon (for example toward the cecum) or the other end of the colon (toward the rectum). (See FIG. 15) A process of neighbor identification and marking occurs. In the example here shown neighbors Nvo0 through Nvo5 are all identified and marked. Next, from each marked neighbor, identification and marking of previously unmarked neighbors occurs. Taking the example of neighbor vertex Nvo2, three neighboring and are marked vertices Nvo2_2, Nvo2_1, and Nvo2_0 are all marked. This process continues along the colon segment here illustrated. As the reader can understand, in the example here illustrated propagation of neighbor vertex identification and marking happens to proceed from the left of FIG. 14 to the right of FIG. 14. It could have just as well occurred in an opposite direction. It will be understood that once directionality of neighbor identification and marking of vertices is established, this directionality will occur from the arbitrarily selected random vertex point VO to an end of the colon.

Figure 15:
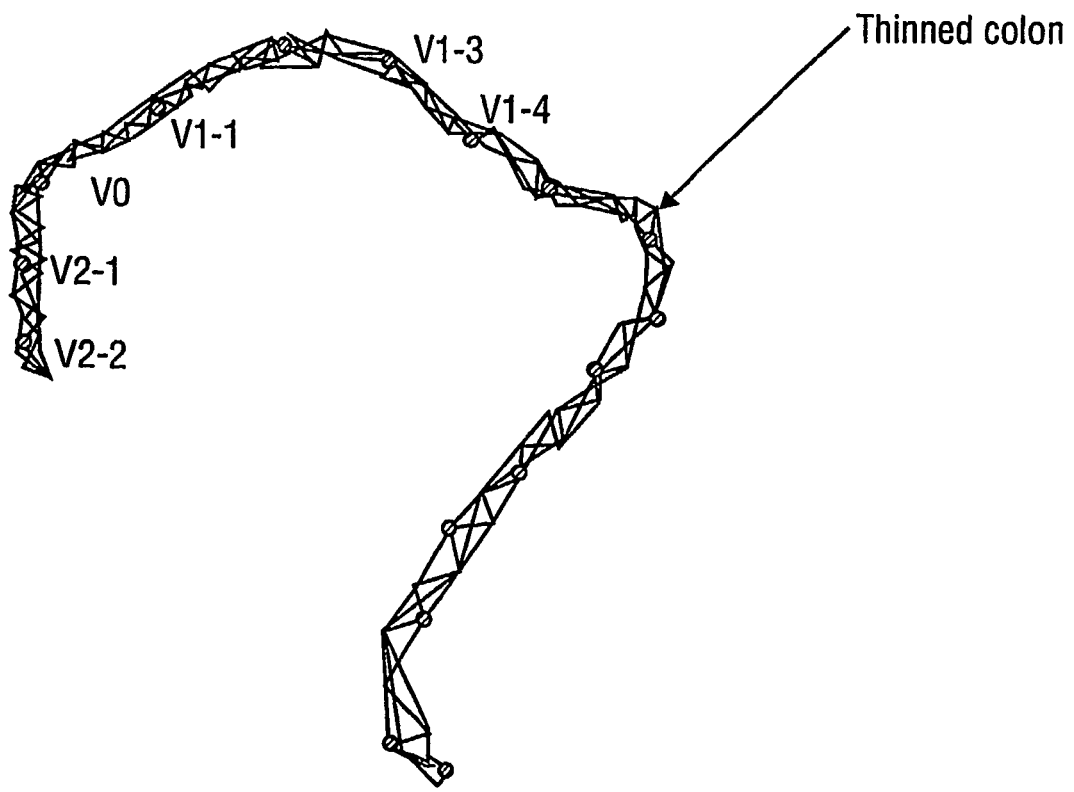

Referring to FIG. 15, the neighbor vertex identification and marking process continues until a located vertices exceeds a predetermined distance from the random vertex point V0 initially designated. When this predetermined distance plus or minus a tolerance) is reached, that vertex becomes a second designated modeling vertex V1-1. At this point, neighbor identification and marking will occur as illustrated in FIG. 14 until a third selected modeling vertex V1-2 is designated. This two-step process of neighbor identification and marking followed by designation of a modeling vertex will continue until an end of the colon is reached.

Again referring to FIG. 15, the reader will understand that it is necessary to have the process of neighbor identification and marking followed by designation of a modeling vertex in an opposite direction. This opposite direction will be from randomly designated modeling vertex point VO (see FIGS. 14 and 15) to the opposite end of the colon. To begin this process, once second selected modeling vertex V1-1 is designated, an opposite modeling vertex V2-1 is designated in a direction opposite to second selected modeling vertex V1-1 at the predetermined distance. Once this choice is made, the two-step process of neighbor identification and marking followed by designation of modeling of vertices continues to the opposite end of the colon.

Thus, it can be seen that the designation of modeling vertex points along the length of the colon effectively establishes a point trace of the shrunken colon image. This has the advantage of avoiding searches through solid angles of view for vertices as set forth in FIG. 6 and is capable of following colon images having relatively sharp curvature. Further, the disclosed process is simple, iterative, and ideal for digital processing.

What is claimed is:

1. An automated detection algorithm embodied in a computer readable medium, the automated detection algorithm to compute a ring profile of colon like surface comprising the steps of:

providing an original image of the colon like surface disposed along a major axis in a scan having vertex points, each vertex point having a discrete point identifier and three dimensional position information;

generating a shrunken version of the colon like surface utilizing neighbors averaging of the three dimensional position information for every vertex point in the original colon view, wherein the shrunken version of the colon like surface has a same number of vertices as the original image of the colon like surface;

modeling the shrunken version of the colon like surface with an ordered set of 3-D points to produce a curve proximate to the major axis of the colon like surface;

isolating segments of vertex points between planes normal to the curve proximate to the major axis of the colon like surface from the shrunken version of the colon like surface; and mapping the isolated segments of vertex points from the shrunken version of the colon like surface back to the original image of the colon like surface to generate a ring profile of the colon like surface.

2. The automated detection algorithm to compute the ring profile of the colon like surface according to claim 1 comprising the steps of: decimating the vertex points of the provided original image.

3. The automated detection algorithm to compute the ring profile of the colon like surface according to claim 1 comprising the steps of: computing a centerline of the colon utilizing the ring profile of the colon like surface.

4. The automated detection algorithm to compute the ring profile of the colon like surface according to claim 3 comprising the steps of: measuring along the computed centerline of the colon like surface to determine positional information relative to the colon like surface.

5. The automated detection algorithm to compute the ring profile of the colon like surface according to claim 3 comprising the steps of: smoothing the computed centerline of the colon.

6. The automated detection algorithm to compute the ring profile of the colon like surface according to claim 3 comprising the steps of: utilizing the ring profile along a preselected length of the computed colon centerline to determine the local colon volume and local colon distension along the preselected length of the colon.

7. The automated detection algorithm to compute the ring profile of the colon like surface according to claim 3 comprising the steps of: mapping the vertices distance to the computed centerline; and building an image of vertices distances to centerline to map the colon.

8. The automated detection algorithm to compute the ring profile of the colon like surface according to claim 3 comprising the steps of: mapping the vertices distance to the computed centerline to obtain a mapped centerline view of the colon;

rotating the mapped centerline view of the colon to spatially reorient the mapped centerline view of the colon; and reconstructing a spatially reoriented image of the colon from the rotated centerline view by expanding the vertices distances to map the colon.

9. The automated detection algorithm to compute the ring profile of the colon like surface according to claim 3, wherein computing the centerline of the colon utilizing the ring profile of the colon like surface comprises determining a center point of a bounding box associated with the ring profile, wherein the centerline includes the center point of the bounding box.

10. The automated detection algorithm to compute the ring profile of the colon like surface according to claim 1, wherein the shrunken version of the colon like surface is associated with a smaller bounding box than the original image of the colon like surface.

11. The automated detection algorithm to compute the ring profile of the colon like surface according to claim 1 wherein the shrunken version of the colon like surface has substantially less volume than the original image of the colon like surface.

12. The automated detection algorithm to compute the ring profile of the colon like surface according to claim 1 wherein generating the shrunken version of the colon like surface utilizing neighbors averaging of the three dimensional position information for every vertex point in the original colon view includes iteratively averaging the three dimensional positional information.

13. An automated detection algorithm embodied in a computer readable medium, the automated detection algorithm to compute a ring profile of a colon like surface comprising the steps of:

providing an original image of the colon like surface disposed along a major axis in a scan having the colon like surface identified by vertex points, each vertex point having a discrete point identifier and three-dimensional positional information;

generating a shrunken image of the colon like surface utilizing neighbors averaging of the three-dimensional positional information for vertex points in the original colon view, wherein the shrunken version of the colon like surface has a same number of vertices as the original image of the colon like surface;

randomly designating a first vertex modeling point at a vertex point along the shrunken colon image;

identifying and marking neighboring vertex points to the randomly selected first vertex modeling point;

designating a second vertex modeling point located at a predetermined distance from the first vertex modeling point;

sequentially repeating the identifying and marking, and designating steps to designate vertex modeling points from the randomly selected first vertex modeling point to an end of the colon;

connecting the designated vertex modeling points to produce a curve proximate to the major axis of the colon like surface;

isolating groups of vertex points between plans normal to the curve from the shrunken image of the colon like surface; and mapping the isolated groups of vertex points from the shrunken image of the colon like surface back to the original image of the colon like surface to generate a ring profile of the colon like surface.

14. An automated detection algorithm embodied in a computer readable medium, the automated detection algorithm to compute an approximate centerline profile of a colon like surface or to compute a ring profile of the colon like surface comprising the steps of:

providing an original image of the colon like surface disposed along a major axis in a scan having the colon like surface identified by vertex points, each vertex point having a discrete point identifier and three-dimensional positional information;

generating a shrunken image of the colon like surface utilizing a neighbors averaging of the three-dimensional positional information for vertex points in the original colon view, wherein the shrunken version of the colon like surface has a same number of vertices as the original image of the colon like surface;

randomly designating a first vertex modeling point at a vertex point along the shrunken colon image;

identifying and marking neighboring vertex points to the randomly selected first vertex modeling point;

designating a second vertex modeling point located at a predetermined distance from the first of vertex modeling point;

sequentially repeating the identifying and marking, and designating steps to designate vertex modeling points from the randomly selected first vertex modeling point to an end of the colon;

and connecting the designated vertex modeling points to produce a curve proximate to the major axis of the colon like surface.

15. A computer readable medium embodying code executable on a processor, the computer readable medium comprising:

code for providing a colon-like surface having original points, wherein each original point has original coordinates comprising a first coordinate, a second coordinate and a third coordinate;

code for generating a set of revised points by iteratively averaging each of the coordinates of adjacent points connected to each original point, wherein a first iteration sums the first coordinate of adjacent points and divides by a number of adjacent points to generate a revised first coordinate, sums the second coordinate of adjacent points and divides by the number of adjacent points to generate a revised second coordinate, and sums the third coordinate of adjacent points and divides by the number of adjacent points to generate a revised third coordinate, wherein subsequent iterations sum a previously revised first coordinate of adjacent points and divides by the number of adjacent points to generate a newly revised first coordinate, sums the previously revised second coordinate of adjacent points and divides by the number of adjacent points to generate a newly revised second coordinate, and sums the previously revised third coordinate of adjacent points and divides by the number of adjacent points to generate a newly revised third coordinate; and code for generating a reduced volume representation of the colon-like surface by compiling the revised points.

16. The computer readable medium of claim 15 wherein the reduced volume representation has a volume that is substantially less than a volume of the colon-like surface.

17. The computer readable medium of claim 15 further comprising:

code for extracting a set of revised points from the reduced volume representation;

code for interpolating a curve from the set of revised points;

code for generating a set of equally distanced planes perpendicular to the curve;

code for dividing the reduced volume representation into segments using the equally distanced planes;

code for generating ring-like sections of the colon-like surface by mapping the revised points in each of the segments to the original points of the colon-like surface;

and code for computing a centerline of the colon utilizing the ring-like sections of the colon-like surface.

18. The computer readable medium of claim 17 wherein code for computing the centerline of the colon utilizing the ring-like sections of the colon-like surface comprises:

code for generating bounding boxes enclosing each of the ring-like sections;

code for determining center points of the bounding boxes; and code for generating the centerline by connecting the center points.

19. The computer readable medium of claim 17 wherein code for extracting the set of revised points from the reduced volume representation comprises:

code for selecting a first point near an end of the reduced volume representation;

code for selecting a second point at a preselected distance from the first point on the reduced volume representation;

code for defining a vector from the first point to the second point;

code for determining a subsequent point on the reduced volume representation at the preselected distance from the second point using the vector;

code for defining a subsequent vector from the second point to the subsequent point;

code for determining another subsequent point on the reduced volume representation at the preselected distance from the subsequent point using the subsequent vector;

and code for determining remaining points of the set of points by repeating the defining the subsequent vector and determining another subsequent point steps.

* * * * *

UNITED STATES PATENT AND TRADEMARK OFFICE
CERTIFICATE OF CORRECTION

PATENT NO. : 7,570,802 B2 Page 1 of 1
APPLICATION NO. : 10/500342
DATED : August 4, 2009
INVENTOR(S) : Iordanescu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Seventh Day of September, 2010

David J. Kappos
*Director of the United States Patent and Trademark Office*